May 24, 1949.  E. W. HUNT  2,471,327
ANGULAR AND LINEAR CALCULATING INSTRUMENT
Filed Dec. 12, 1945
2 Sheets-Sheet 1
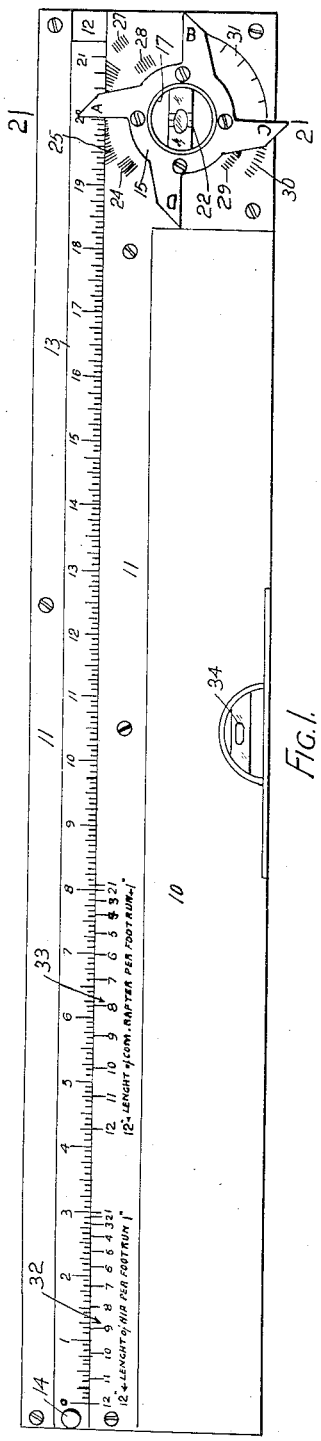
Inventor:
Ernest William Hunt
by his Attorneys
Howson & Howson May 24, 1949.  E. W. HUNT  2,471,327
ANGULAR AND LINEAR CALCULATING INSTRUMENT
Filed Dec. 12, 1945
2 Sheets-Sheet 2
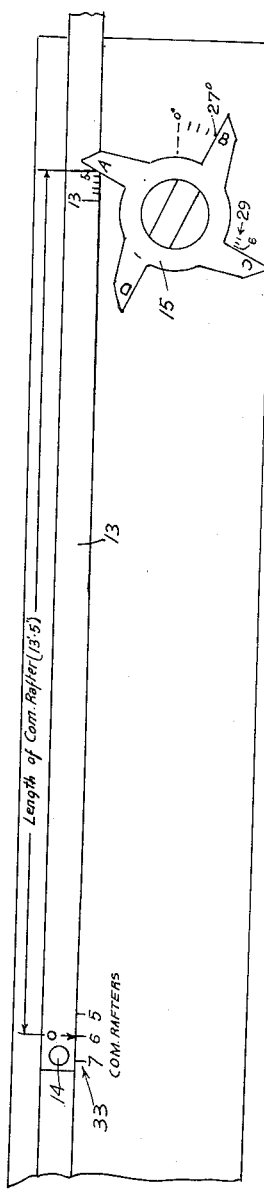
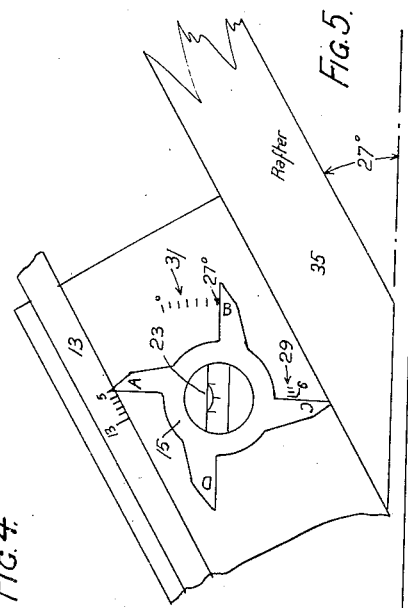
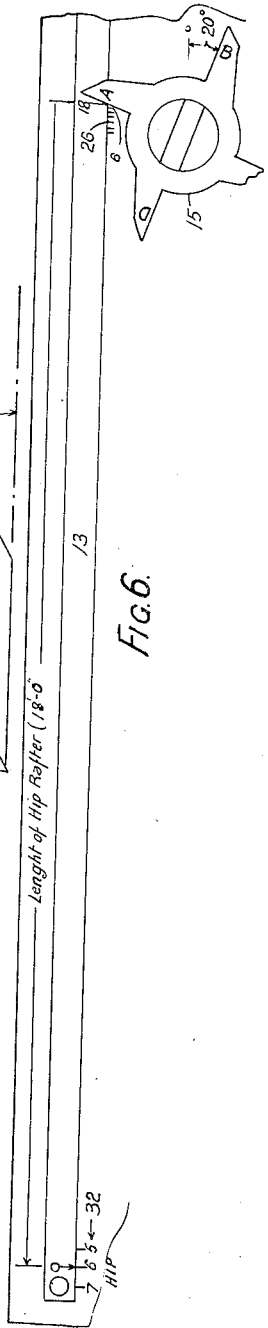
Inventor:
Ernest William Hunt
by his Attorneys
Howson & Howson

Patented May 24, 1949

2,471,327

UNITED STATES PATENT OFFICE 2,471,327

ANGULAR AND LINEAR CALCULATING INSTRUMENT

Ernest William Hunt, Crows Nest, near Sydney, New South Wales, Australia, assignor of one-half to Henry Phipps John Woodward, Waverton, near Sydney, New South Wales, Australia Application December 12, 1945, Serial No. 634,454
In Australia January 23, 1945

2 Claims. (Cl. 235—61)

This invention has been devised to provide an instrument for ascertaining the angle of an inclined surface and or the length of such surface and or for delineating angles.

The following are a few examples of the many uses to which the instrument of this invention can be applied, that is to say it can be used to:

(a) Ascertain the angles of inclined rafters or other inclined members where rise per foot and horizontal span are known.

(b) Ascertain the length of inclined rafters or other inclined members when angles of inclination are known.

(c) Ascertain the plumb angle and the foot angle of a rafter or other inclined member.

(d) Ascertain the angle of a fall or rise of land and the foot run of the fall or rise.

The instrument simplifies and expedites the process of finding the angles and lengths as aforesaid.

Basically the instrument consists of a frame or base incorporating a slidable scale which is suitably graduated, commencing from a zero mark and which is adapted to register with length of hip per foot run and length of common rafter per foot run graduations made on the base. A rotatable cursor incorporated in the base has pointers thereon which are adpated to register with graduations on the slidable scale and with a series of pitch and degree graduations formed radially about the axis of the cursor. For certain applications of the instrument a level bulb is incorporated in the cursor.

The instrument may have incorporated therein ordinary horizontal and vertical levels to make a complete builder's-level instrument.

An embodiment of the invention constructed for the stated uses is illustrated in the annexed drawings. Fig. 1 is a side view of the instrument; Fig. 2 is a section on line 2—2 of Fig. 1; Fig. 3 is an enlarged view of the annular disposed graduations on the instrument with the rotatable cursor removed; Figs. 4, 5 and 6 illustrate examples of applications of the instrument.

In this embodiment the instrument has a base 10 of rectangular section as an ordinary builder's level. On one side this base 10 has a metal plate 11 with a longtiudinal slot 12 therein slidably housing a scale 13. Each of the units of the scale represents a foot and said unit is divided into twelve divisions representing inches and it has a zero mark. Finger grip 14 is provided to manipulate the scale.

Near one end the base 10 has a cylindrical opening 18 and a sleeve 17 rotatable in said cylindrical opening 18 has a flange 16 on which cursor 15 is mounted. The cursor is on the same face as the scale 13 and it has four pointers A, B, C and D equally positioned about its periphery. Two of these pointers B and D are in the same longitudinal plane as the level bulb 22. The other pointers A and C are at right angles to the first pointers positioned so that a line through them bisects the level bulb. The other end of the sleeve 17 is screwed to take a nut 21 which is housed in recess 20 in the opening 18 and bears upon spring 19 in said recess thereby imparting spring tension to the cursor 15. Centrally and diametrically disposed within the sleeve 17 is the level bulb 22 with the usual level markings 23 thereon.

Surrounding the cursor 15 in radial formation and in juxtaposition to the pointers A, B, C, D are a series of groups of graduations 24, 25, 26, 27, 28, 29 and 30. Each group of these graduations delineate various and different pitches. Group 24 are for edge cut of purlins; group 25 for back angle of hips; group 26 for plumb cut for hips; group 27 for edge cut of hips; group 28 for edge cut of rafters; group 29 for plumb cut of common rafters; and group 30 for side cut for purlins. Associated with the above graduations also in juxtaposition to the pointers A, B, C, D is a scale 31 graduated in degrees.

On the metal plate 11 near the end of the base 10 opposite to the cursor 15 and juxtaposed the slidable scale 13 are another pair of groups of lengths of hip per foot run and length of common rafter per foot run graduations 32 and 33. Group 32 are for the purpose of obtaining the length of a hip and group 33 are for obtaining the length of a common rafter.

All the groups of graduations referred to above are calibrated in the manner well known in the art.

The instrument may have the usual level bulb 34 embodied therein, whereby said instrument can be utilized as an ordinary level.

In use to obtain say the length of a common rafter (see Fig. 4) having say a six inch rise in a foot and a horizontal span of 12 feet, the cursor 15 is turned until pointer C registers with numeral "6" of group 29. Scale 13 is then slid until the zero mark registers with numeral "6" in group 33. Pointer A will thus intersect the scale at a point 13/5 thereby giving the length of common rafter as 13 feet 5 inches. The pitch of the rafter is shown by the pointer B registering with the graduation representing 27°.

When erecting a common rafter 35 (see Fig. 5) and to be set at 27° the instrument is then utilized by being placed upon the top side of the rafter 35 and the rafter adjusted until the bulb within the level 22 is situated centrally of centre mark 23. To obtain the length of a hip rafter with six inch rise in the foot and a horizontal span of 17 feet the cursor 15 is turned until pointer A registers with numeral "6" of group 26. Scale 13 is then slid until the zero mark registers with numeral "6" of group 32. The pointer A of cursor 15 will intersect the scale at point "18" therefore the length of the hip rafter is 18 feet, and to be set at an angle of 20°.

When any one of the pointers A, D and C is placed into register with a particular graduation of any of the groups the pointer B will disclose the degree angle of such particular graduation.

When the instrument is utilized for drainage or other such like purposes, groups 29 and 33 are employed in similar manner as that described with reference to a common rafter.

I claim:

1. An angle and linear calculating instrument consisting of a base incorporating a slidable scale with a zero mark thereon juxtaposed graduations on the base parallel to the slidable scale said graduations being calculated as a pitch scale for indicating the length of an inclined member where rise per foot run and span are known; a rotatable cursor mounted on said base, at least two pointers on said rotatable cursor one of said pointers being juxtaposed graduations on the slidable scale and the other said pointer being juxtaposed graduations on said base formed radially about said cursor and calculated as a pitch scale; said pointers being arranged in relation to the scales formed radially about the cursor so that if the zero mark on the slidable scale is set to a particular value of pitch on said base scale and one of said pointers is set to the pitch scale juxtaposed said cursor the other said pointer will indicate on the sliding scale the length of the inclined member.

2. An angle and linear calculating instrument consisting of a base incorporating a slidable scale with a zero mark therein juxtaposed graduations on the base parallel to the slidable scale said graduations being calculated as a pitch scale for indicating the length of an inclined member where rise per foot run and span are known; a rotatable cursor mounted on said base, at least two pointers on said rotatable cursor one of said pointers being juxtaposed graduations on the slidable scale and the other said pointer being juxtaposed graduations on said base formed radially about said cursor and marked as degree graduations; said pointers being arranged in relation to the scales formed radially about the cursor so that if the zero mark on the slidable scale is set to a particular value of pitch on said base scale and one of said pointers is set to the pitch scale juxtaposed said cursor the other said pointer will indicate on the radial scale about the cursor the angle of inclination of a member.

ERNEST WILLIAM HUNT.

REFERENCES CITED

The following references are of record in the file of this patent:

UNITED STATES PATENTS

| Number | Name | Date |
|---|---|---|
| 31,987 | Light | Apr. 9, 1861 |
| 876,264 | Bunley | Jan. 7, 1908 |
| 966,321 | Dunstan | Aug. 2, 1910 |
| 1,310,444 | Rohm | July 22, 1919 |
| 1,346,547 | Lackland | July 13, 1920 |
| 1,441,914 | Deisch | Jan. 9, 1923 |
| 2,113,524 | Wolfe | Apr. 5, 1938 |